Patented June 20, 1950

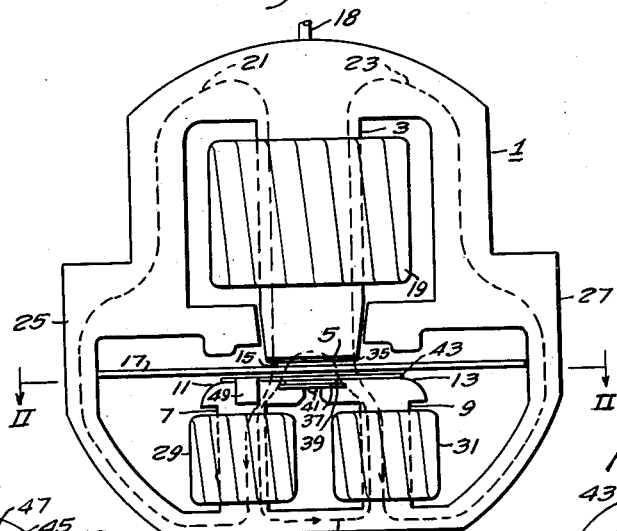

2,512,345

UNITED STATES PATENT OFFICE 2,512,345

WATT-HOUR METER PHASE ADJUSTER

Richard M. Leippe, Cedar Grove, N. J., assignor to Westinghouse Electric Corporation, East Pittsburgh, Pa., a corporation of Pennsylvania Application April 30, 1947, Serial No. 745,023

19 Claims. (Cl. 171—34)

This invention relates to a device for establishing a predetermined displacement between the magnetic flux components of a shifting magnetic field and it has particular relation to a lagging or quadrature adjusting member for establishing the correct displacement between the voltage and current magnetic fluxes of an alternating-current watthour meter.

In accordance with the invention, a lagging member is provided for establishing a desired phase displacement between the magnetic flux components of a shifting magnetic field. This lagging member is movable for the purpose of adjusting the phase displacement and preferably is rotatable for adjustment purposes. When the lagging member is employed for establishing the correct phase displacement between current and voltage magnetic fluxes in an alternating-current watthour meter, the lagging member conveniently may be disposed to lag both the voltage and current magnetic fluxes.

In a preferred embodiment of the invention, the lagging member takes the form of an annular electroconductive rim. Although the annular rim may be of rectangular or square perimeter, preferably it is of circular configuration. An electroconductive bar extends across the annular rim to connect spaced portions of the rim. When an annular rim of circular configuration is employed, the bar conveniently may extend diametrically thereacross.

Since rotation of the lagging member tends to vary somewhat the pattern of the magnetic fluxes, such rotation under some conditions might tend to alter the light load performance of the watthour meter. By proper selection of the axis of rotation of the lagging member, the light load adjustment of the watthour meter can be made substantially independent of the adjustment of the lagging member.

Conventional watthour meters have magnetic shunts associated therewith for the purpose of controlling the load response of the watthour meter. In accordance with a further aspect of the invention, the lagging member is rotatably secured to the magnetic shunt of a watthour meter to constitute a unit which is detachably associated with the magnetic structure of the watthour meter.

It is, therefore, an object of the invention to provide an improved device which is movable for the purpose of adjusting the phase displacement between the magnetic flux components of a shifting magnetic field.

It is a further object of the invention to provide a lagging member in the form of an annular electroconductive rim having an electroconductive bar extending thereacross.

It is a still further object of the invention to provide a watthour meter lagging member which is movable for adjusting the phase displacement between the magnetic fluxes of a shifting magnetic field through a path such that the light load adjustment of the associated watthour meter is substantially independent of such movement.

It is also an object of the invention to provide a watthour meter having associated therewith as a detachable unit a magnetic shunt and a lagging member rotatably secured to the shunt.

It is another object of the invention to provide an adjustable watthour meter lagging member which may be moved to adjust the light load response of a watthour meter.

Other objects of the invention will be apparent from the following detailed description, taken in conjunction with the accompanying drawing, in which:

Figure 1 is a view in front elevation of a watthour meter embodying the invention;

Fig. 2 is a sectional view, with parts broken away, taken along the line II—II of Fig. 1;

Fig. 3 is a view similar to Fig. 2, but with an adjustable part shown in a different position; and Figs. 4, 5 and 6 are views similar to Fig. 2 showing different constructions for certain parts thereof.

Referring to the drawing, Fig. 1 shows a watthour meter having a magnetic structure 1. This magnetic structure includes a voltage magnetic pole 3 having a pole face 5. The magnetic structure also includes a pair of current magnetic pole pieces 7 and 9 having pole faces 11 and 13. By inspection of Fig. 1, it will be observed that the pole faces 11 and 13 are disposed in a common plane which is spaced from the pole face 5 to define an air gap 15 in which an electroconductive armature in the form of a disk 17 is disposed. Conveniently, the disk 17 may be mounted on a shaft 18 for rotation in a manner well understood in the art.

In order to direct magnetic flux through the air gap 15, the voltage magnetic pole 3 is surrounded by a voltage winding 19. When the voltage winding 19 is energized from a source of alternating voltage, an alternating voltage magnetic flux is established which traverses the air gap 15 and the disk 17 positioned in the air gap. Such magnetic flux is represented in Fig. 1 by dotted lines 21 and 23 which have arrows associated therewith for the purpose of indicating an instantaneous direction of flux flow. It will be observed that the voltage magnetic flux represented by the dotted line 21 passes through the voltage magnetic pole piece 3, traverses the air gap 15 and the disk 17 located in the air gap to enter the current magnetic pole piece 7. The magnetic flux then returns to the magnetic pole piece through the left-hand arm 25 of the magnetic structure, as viewed in Fig. 1. In a similar manner, the magnetic flux represented by the dotted line 23 traverses the air gap 15 and the disk 17 located therein to enter the current magnetic pole piece 9. This magnetic flux returns to the voltage magnetic pole piece through a right-hand arm 27 of the magnetic structure 1.

Current windings 29 and 31 are disposed respectively about the current magnetic pole pieces 7 and 9. These windings are connected in series and are oppositely poled so that when the winding 29 directs a magnetomotive force downwardly in the current magnetic pole piece 7, the winding 31 establishes an equal upwardly-directed magnetomotive force in the current magnetic pole piece 9. The resulting flow of magnetic flux is represented in part by a dotted line 33 which has an instantaneous direction of flow represented by an arrow. As shown in Fig. 1, the magnetic flux represented by the dotted line 33 enters the air gap 15 from the current magnetic pole piece 9, traverses the disk 17 and may possibly enter the voltage magnetic pole piece 3. The magnetic flux then bends downwardly to cross the disk 17 again and enters the current magnetic pole piece 7. From the last-mentioned pole piece, the magnetic flux returns to the magnetic pole piece 9 through an appropriate part of the magnetic structure 1.

Additional current magnetic flux may flow in paths similar to those represented by the dotted lines 21 and 23. For the assumed instantaneous conditions, current magnetic flux traversing the path represented by the dotted line 23 would flow in a direction opposite to that represented by the arrow on the line.

In order to adjust the light-load performance of the watthour meter, a light-load adjuster 35 in the form of an electroconductive plate is positioned in the air gap 15 adjacent the pole face 5. As well understood in the art, this plate may be adjusted for the purpose of lagging a varying amount of the voltage magnetic flux to provide a light-load adjusting torque acting on the disk 17.

For the purpose of controlling the load response of the watthour meter, a magnetic shunt 37 is positioned between the current magnetic pole pieces 7 and 9 adjacent their pole faces. The magnetic shunt may be spaced from the associated pole pieces by means of a non-magnetic plate 39 to which the shunt is secured by means of a rivet 41.

The parts of Fig. 1 which thus far have been specifically described are all well known and well understood in the art. For this reason, an extended discussion of the parts thus far specifically described is believed to be unnecessary.

When the voltage winding 19 and the current windings 29 and 31 are energized, it is desirable that the magnetic fluxes therefrom which traverse the air gap 15 have a predetermined phase relationship. For a watthour meter, this phase relationship should be such that at unity power factor, the two magnetic fluxes are in quadrature. Although the voltage winding 19 may have substantial inductance for the purpose of lagging its voltage magnetic flux substantially behind the voltage applied to the winding, such lagging does not suffice to establish the desired phase relationship between the voltage and current magnetic fluxes.

In accordance with the invention, a lagging or quadrature member is disposed in the air gap 15 for the purpose of lagging one or both of the magnetic fluxes. This lagging member may be located at any position in the air gap either adjacent the current magnetic pole piece or the voltage magnetic pole pieces wherein it intercepts or surrounds the desired magnetic flux. In the specific embodiment of Fig. 1, a lagging member 43 rests on the pole faces 11 and 13 and conveniently may be secured to the magnetic shunt 37 by the rivet 41. With such a construction, the magnetic shunt 37 and the lagging member 43 may be assembled as a unit and installed in the magnetic structure or removed therefrom as a unit. For example, the non-magnetic plate 39 may be received in a dove-tailed slot formed by the current magnetic pole pieces 7 and 9 and may be frictionally retained therein.

The configuration of the lagging member 43 is clearly shown in Figs. 2 and 3. The lagging member includes an annular electroconductive rim 45. Good results have been obtained with annular rims having rectangular or square perimeters but in the preferred embodiment of Fig. 2 a circular annular rim is disclosed. The annular rim is connected at spaced points by means of an electroconductive bar 47. The lagging member may be mounted for movement relative to the associated magnetic structure in any desired manner. As previously pointed out, in a preferred embodiment of the invention the lagging member 43 is secured rotatably to the magnetic shunt 37 by means of the rivet 41 which passes through the electroconductive bar 47. Angular movement of the electroconductive lagging member 43 about the rivet 41 may be through any desired angle. A stop 49 is provided for limiting the angular movement of the lagging member 43 to the extreme positions illustrated in Figs. 2 and 3 which differ from each other by 90°. By inspection of Fig. 1, it will be observed that the stop 49 engages the current magnetic pole pieces in the limiting positions of the lagging member 43. If desired, a scale (not shown) may cooperate with the stop to indicate the angular position of the lagging member.

If the lagging member were perfectly symmetrical, for example, a disk of electroconductive material, it would serve to lag magnetic fluxes traversing the disks substantially equally for all annular positions of the disk about its axis of rotation. In order to provide an adjustment, some asymmetry is provided. In the present case, such asymmetry is provided by the use of a single bar 47 which divides the lagging member in two parts each having an opening 51 or 53. The resulting structure has substantially a "figure of eight" configuration which is clearly apparent from Figs. 2 and 3.

The operation of the lagging member may be understood more clearly by tracing the paths of the magnetic fluxes relative to the lagging member. By inspection of Fig. 2, it will be observed that the voltage magnetic fluxes represented by the dotted lines 21 and 23 both enter the paper in Fig. 2 in the same direction. Such voltage magnetic fluxes tends to induce an electromotive force in the rim 45 which directs current around the rim. Consequently, the rim 45 operates substantially as a conventional lag loop to lag the voltage magnetic flux. It should be observed that the lagging produced by the rim 45 on the voltage magnetic flux is substantially the same for all positions of the lagging member 43. This follows from the fact that the rim 45 is fully symmetrical about its axis of rotation.

The current magnetic flux also is shown in Fig. 2. It will be noted that such magnetic flux emerges from the paper towards the observer at a point 33b and re-enters the paper traveling away from the observer at a point 33a.

With respect to the current magnetic flux, the lagging member 43 may be considered to comprise two electroconductive loops, one loop having the opening 51 and the second loop having the opening 53. The bar 47 is common to both loops. For the assumed conditions in Fig. 2, all current magnetic flux entering the opening is directed into the paper and travels away from the observer. All current magnetic flux entering the opening 53 emerges from the paper towards the observer. The resulting electromotive forces produce current flow in the same direction through the bar 47 and the resultant current divides between the two halves of the rim 45 which connect the ends of the bar in parallel. Consequently, the current magnetic flux also is lagged by the lagging member 43.

Adjustment of the lagging member 43 to the position illustrated in Fig. 3 has substantially no effect on the lagging of the voltage magnetic flux. However, a brief consideration of Fig. 3 will show that the lagging member 43 no longer lags appreciably the current magnetic flux. It will be noted that in Fig. 3 equal amounts of current magnetic flux pass in opposite directions through each of the openings 51 and 53. Consequently, the lagging of current magnetic flux is a minimum with the lagging member 43 in the position illustrated in Fig. 3.

It may be observed that some lagging of current magnetic flux takes place even with the lagging member in the position illustrated in Fig. 3 for the reason that the lagging member is made of electroconductive material and local eddy currents are produced therein by magnetic flux which directly cuts or traverses such electroconductive material. However, such lagging is small compared to the lagging obtained by magnetic flux passing through the openings 51 and 53 for the case illustrated by Fig. 2 and is substantially uniform for all positions of the lagging member.

From the foregoing discussion, it will be clear that by adjusting the lagging member between the positions illustrated in Figs. 2 and 3, the phase displacement between the current and voltage magnetic fluxes may be adjusted to a desired value, the lagging member may be retained in any position of adjustment in any desired manner, for example, the rivet 41 may secure the lagging member frictionally to the shunt sufficiently to prevent accidental rotation thereof.

In some cases, adjustment of the lagging member may affect the light-load adjustment of the associated watthour meter. This is for the reason that the pattern of the magnetic fluxes is changed slightly as a result of rotation of the lagging member. If desired, the effects of the lagging member on the light-load adjustment may be substantially eliminated by properly shifting the lagging member during its adjustment. Such shifting may be effected by (1) displacing the axis of rotation of the lagging member from the center of the shunt or center line of the magnetic structure, or (2) by mounting the lagging member for rotation about an axis which is displaced from the axis of the rim, or (3) by a combination of such displacements. For example, in Fig. 4, a lagging member 43a is shown which corresponds to the lagging member 43 of Figs. 1 to 3 and which has annular rim 45a corresponding to the rim 45 of Figs. 2 and 3. However, the lagging member 43a is rotatably secured to the shunt 37 by a rivet 41a which is displaced by a distance A from the axis of the circular rim 45a and from the center of the shunt 37. Consequently, as the lagging member 43a is rotated about the rivet 41a, it not only is angularly adjusted about the axis of the rim 45a, but it is shifted with respect thereto. By proper selection of the distance A and the direction of displacement of the rivet 41a from the axis of the rim 45a and from the center of the shunt, the shift of the lagging member 43a as it is adjusted may be selected to make the light-load adjustment of the watthour meter substantially independent of adjustment of the lagging member. In Fig. 4, the axis of rotation of the lagging member is displaced from the center of the shunt and from the axis of the rim by the same distance.

In Fig. 5 a lagging member 43b is provided which is similar to the lagging member 43. The embodiment of Fig. 5 differs from that of Fig. 2 only in the mounting of the lagging member 43b by the rivet 41 for rotation about an axis which is displaced from the axis of the rim of the lagging member by a distance B. It should be noted that the rivet 41 is disposed at the center of the shunt 41. By proper selection of the magnitude of the distance B and of the direction of displacement, light-load compensation may be provided.

Referring now to Fig. 6, a lagging member 43c is disclosed which is similar to the lagging member 43 of Fig. 2. However, in Fig. 6, the lagging member is mounted suitably on a support 61 for rotation about a desired axis, such as the axis of its rim, relative to the support 61. For example, lips 63 are secured to the support and are bent over the rim of the lagging member to guide it for rotation. In effect, the three lips illustrated define a channel through which the rim of the lagging member 43 may be rotated without necessitating a centrally disposed pivot.

The support 61 is mounted for reciprocation in the direction of the arrows C relative to the magnetic structure 1 in any suitable manner. For the purpose of illustration, a screw 65 is mounted for rotation in a bracket 67 which is secured to the magnetic structure. The screw 65 is in threaded engagement with the support 61. Rotation of the screw reciprocates the support relative to the magnetic structure as desired.

By rotation of the lagging member 43c, the phase angle may be adjusted. The lagging member may be secured in adjusted position by means of a machine screw 69 which is in threaded engagement with the support 61 and which has a head overlying the rim of the lagging member. The screw may be actuated to clamp the lagging member to the support.

Reciprocation of the support 61 moves the lagging member to adjust the light-load performance of the meter. Consequently, the adjuster 35 may be omitted, if desired, when the embodiment of Fig. 6 is employed.

The lagging member 43 may be constructed in any desired manner. For example, it may be cut or punched as an integral unit from a sheet of copper, brass or bronze having the desired impedance characteristics. Alternatively, the rim and bar of the lagging member may be constructed separately and may be joined subsequently in any suitable manner as by soldering or brazing. For example, in Fig. 4 the rim 45a and its associated electroconductive bar 47a may be separately cut from suitable material and may be secured to each other in any suitable manner.

From the consideration of Figs. 2 and 3, it will be recalled that the current flowing through the bar 47 is produced substantially only by the current magnetic flux. Since this is the case, the impedance characteristics of the bar 47 may differ from those of the rim 45 for the purpose of providing additional desirable performance characteristics of the watthour meter. For example let it be assumed that in Fig. 4 the rim 45a is constructed of a first material such as bronze and that the bar 47a is constructed of copper or other material having a temperature coefficient of resistance substantially higher than that of the first material. By proper selection of the temperature coefficients of resistance, the lagging member 43a may be designed to provide the temperature control described in the Oman Patent 1,764,339.

Although the invention has been described with reference to certain specific embodiments thereof, numerous embodiments thereof are possible. Therefore, the appended claims have been drafted to cover all modifications and embodiments falling within the spirit and scope of the invention.

I claim as my invention:

1. In an alternating-current device, means effective when energized for producing a first alternating magnetic flux, means effective when energized for producing a second alternating magnetic flux cooperating with the first alternating magnetic flux to establish a shifting magnetic field, and means for controlling the phase relationship between the magnetic fluxes, said last-named means comprising a lagging member for lagging the first alternating magnetic flux by an amount dependent on the angular position of the lagging member relative to the first alternating magnetic flux about an axis, and means mounting the lagging member for angular movement relative to the first alternating magnetic flux about said axis, the lagging member being positioned to lag the second alternating magnetic flux, and the lagging member being configured to lag the second alternating magnetic flux by substantially the same amount for all angular positions of the lagging member about the axis.

2. An alternating current device comprising means effective when energized for producing magnetic flux and a lagging member for the magnetic flux, said lagging member including an electroconductive substantially circular rim and an electroconductive bar extending diametrically across said rim.

3. A device as set forth in claim 2 wherein said lagging member is mounted for rotation relative to the means about an axis extending through the region enclosed within the circular rim.

4. In an alternating device responsive to the relation between two alternating quantities, means effective when energized for producing two magnetic fluxes which cooperate to establish a shifting magnetic field, an electroconductive armature disposed in the magnetic field, means mounting the armature for movement in response to the shifting magnetic field, a lagging member disposed in the path of at least one of the magnetic fluxes, said lagging member being configured to change the amount of lagging of the associated magnetic flux in response to rotation of the lagging member relative to the first means about a first axis, and means mounting the lagging member for movement through a predetermined path, said movement comprising a rotation of the lagging member about the axis and a simultaneous shifting movement of the lagging member relative to the axis which bears a predetermined relation to the rotation of the lagging member for simultaneously changing the lagging and the portion of the magnetic flux which is subject to control by the lagging member.

5. In an alternating device responsive to the relation between two alternating quantities, means effective when energized for producing two magnetic fluxes which cooperate to establish a shifting magnetic field, an electroconductive armature disposed in the magnetic field, means mounting the armature for movement in response to the shifting magnetic field, a lagging member disposed in the path of at least one of the magnetic fluxes, said lagging member being configured to change the amount of lagging of the associated magnetic flux in response to rotation of the lagging member relative to the first means about a first axis, and means mounting the lagging member for rotation about a second axis displaced from the first axis to change the angular position of the lagging member about the first axis and simultaneously to shift the lagging member relative to the first axis, whereby the torque applied to said armature is modified both by the resulting change in lagging and by the resulting change in the portion of the magnetic flux which is subject to control by the lagging member.

6. In an alternating current device, a first magnetic pole piece having a first pole face, a pair of spaced second pole pieces having second pole faces disposed substantially in a common plane said second pole faces being spaced from the first pole piece to define an air gap, an electroconductive armature disposed in said air gap, means mounting the armature for rotation relative to the pole pieces, first winding means effective when energized by alternating current for directing alternating first magnetic flux in a path which extends from the first pole face through the armature to the second pole faces in parallel, second winding means effective when energized by alternating current for directing alternating second magnetic flux through two paths which extend from the second pole faces through the armature in substantially opposite directions, an electroconductive lagging member having two openings establishing a figure-of-eight configuration, and means mounting the lagging member for movement from a position wherein the second magnetic flux is directed in a single direction through each of the openings in the lagging member, the directions in the two openings being substantially opposite, to a position wherein said second magnetic flux has two portions oppositely directed through each of the openings.

7. A device as claimed in claim 6 wherein the first magnetic flux is directed through the two openings of the lagging member in the same direction.

8. In an alternating current device, a first magnetic pole piece having a first pole face, a pair of spaced second pole pieces having second pole faces disposed substantially in a common plane said second pole faces being spaced from the first pole piece to define an air gap, an electroconductive armature disposed in said air gap, means mounting the armature for rotation relative to the pole pieces, first winding means effective when energized by alternating current for directing alternating first magnetic flux in a path which extends from the first pole face through the armature to the second pole faces in parallel, second winding means effective when energized by alternating current for directing alternating second magnetic flux through a path which extends from one of the second pole faces through the armature to the other of the second pole faces, an electroconductive lagging member having an annular electroconductive rim and an electroconductive bar extending diametrically across said rim to establish two openings within the rim thereby providing a structure having substantially a figure-of-eight configuration, means mounting the lagging member in the air gap for angular movement about an axis passing through the bar, said lagging member in one position having the second magnetic flux directed through a first one of the openings over the bar and through the second one of the openings to establish a flux loop around said bar for lagging the second magnetic flux, said lagging member being rotatable about the axis to vary the magnitude of the flux in said flux loop.

9. An alternating-current device as set forth in claim 8, wherein said first magnetic flux is directed through said rim to lag the first magnetic flux.

10. An alternating-current device as set forth in claim 9 wherein the rim and the bar have different temperature coefficients of impedance.

11. An alternating-current device as set forth in claim 8 wherein the device includes a light-load adjuster and said axis is displaced from the axis of symmetry of the lagging member in a direction and by an amount sufficient to make the light-load response of the device substantially independent of the angular position of the lagging member about the axis of rotation.

12. In an alternating-current watthour meter, a magnetic structure comprising a voltage magnetic pole piece having a voltage pole face, and a pair of spaced current magnetic pole pieces having current pole faces disposed in a common plane spaced from the voltage pole face to define an air gap therebetween, an electroconductive armature positioned in the air gap, means mounting the armature for rotation relative to the magnetic structure, a voltage winding associated with the voltage magnetic pole piece, said winding being effective when energized by an alternating voltage for directing alternating voltage magnetic flux between the voltage pole face and the current pole faces in parallel, current windings associated with the current magnetic pole pieces, said current windings being effective when energized by an alternating current for directing alternating current magnetic flux in series through a first path which extends from one of the current pole faces through the armature and through a second path which extends through the armature to the other of the current pole faces, and a lagging member having a circular electroconductive rim positioned in the air gap to surround substantial portions of the voltage magnetic flux and said two paths, and an electroconductive bar extending between said paths to connect spaced points of said rim.

13. A meter as defined in claim 12 wherein means mount said lagging member for movement relative to the magnetic structure to a new position wherein said bar substantially intercepts at least one of the paths.

14. A meter as defined in claim 12 including means mounting the lagging member for rotation substantially about the axis of said rim.

15. A meter as defined in claim 12 including means mounting the lagging member for rotation about an axis parallel to and displaced from the axis of the rim for the purpose of making the light-load adjustment of the meter independent of the position of the lagging member.

16. An alternating-current watthour means comprising a magnetic structure effective when energized for establishing a shifting magnetic field, an armature positioned in the magnetic field for movement in response thereto relative to the magnetic structure, a magnetic shunt detachably secured to the magnetic structure for controlling the response of the armature to energization of the magnetic structure, a lagging member for adjustably controlling the phase relationship between the components of the magnetic field in accordance with the angular position of the lagging member about an axis, and means rotatably securing the lagging member to the shunt for installation or removal therewith as a unit relative to the magnetic structure.

17. In an alternating-current device, means effective when energized for producing a first alternating magnetic flux, means effective when energized for producing a second alternating magnetic flux cooperating with the first alternating magnetic flux to establish a shifting magnetic field, and means for controlling the phase relationship between the magnetic fluxes, said last-named means comprising a lagging member for lagging the first alternating magnetic flux by an amount dependent on the angular position of the lagging member relative to the first alternating magnetic flux about an axis passing through the lagging member within the periphery of the lagging member and within the space traversed by the first alternating magnetic flux, and means mounting the lagging member for angular movement relative to the first alternating magnetic flux about said axis.

18. A device as claimed in claim 17 wherein the lagging member is also positioned to lag the second magnetic flux.

19. An alternating current device comprising means effective when energized for producing magnetic flux and a lagging member for the magnetic flux, said lagging member including an electroconductive closed loop and an electroconductive element extending between spaced points on the loop, said loop and element having different temperature coefficients of impedance.

RICHARD M. LEIPPE.

REFERENCES CITED

The following references are of record in the file of this patent:

UNITED STATES PATENTS

| Number | Name | Date |
|---|---|---|
| 1,518,196 | Harris | Dec. 9, 1924 |
| 1,856,554 | Harris | May 3, 1932 |
| 2,146,606 | Trekell | Feb. 7, 1939 |
| 2,363,284 | Barnes | Nov. 21, 1944 |
| 2,365,588 | Petsinger | Dec. 19, 1944 |

FOREIGN PATENTS

| Number | Country | Date |
|---|---|---|
| 691,375 | Germany | May 24, 1940 |